June 28, 1932.　　　B. OBER ET AL　　　1,865,383
PROCESS FOR MANUFACTURING ACID PHOSPHATE
Filed June 30, 1926　　2 Sheets-Sheet 1

Inventor
BEVERLY OBER
AND
E. H. WIGHT

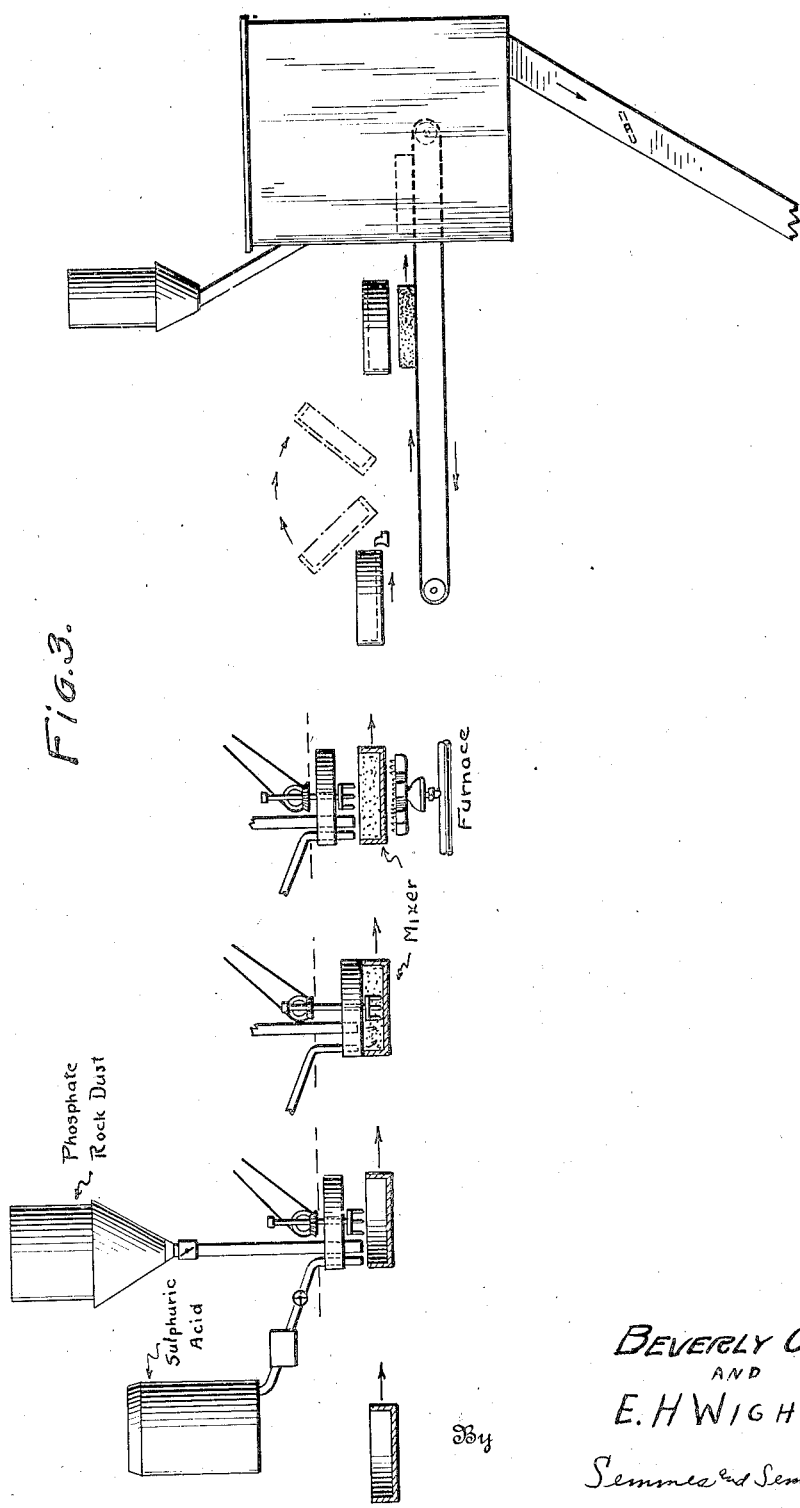

Patented June 28, 1932

1,865,383

UNITED STATES PATENT OFFICE

BEVERLY OBER AND EDWARD HYATT WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PROCESS FOR MANUFACTURING ACID PHOSPHATE

Application filed June 30, 1926. Serial No. 119,741.

In the usual method of preparing acid phosphate now employed, insoluble phosphate rock is first ground and then treated with sulphuric acid. The mixture of ground rock and acid is discharged into a den and allowed to remain there until it forms a spongy porous mass. This mass is then generally disintegrated and removed to a curing shed where it remains for a considerable time to allow complete curing.

An outstanding disadvantage of such a process is that the initial porosity of the mass is broken down, due to the disintegrating step and also to the fact that the batches of material after treatment with the acid are dumped one on the other in the den. By thus destroying the porosity of the mass, the subsequent steps of crystallization and drying are greatly retarded. The maintenance of the mass in large piles impedes the dissipation of heat and hence retards crystallization. In general, in such a process the ingredients are mixed and the subsequent reactions allowed to proceed without any assistance either as to the regulation of the chemical or physical conditions of the reacting mass.

An object of this invention is therefore to accelerate the reaction occurring in the process of manufacturing acid phosphate.

Another object is to insure an initial high degree of porosity in the mass and to maintain this porosity substantially unimpaired throughout the process.

Yet another object is to treat the phosphate raw material in relatively small batches and to maintain a unit mass throughout treatment.

We accomplish these and other objects, which will appear hereinafter, by treating batches of phosphatic raw material with an acid and heating the mixture during the early stages of reaction.

To render the invention more easily understood, there is shown in the accompanying drawings a diagrammatic representation of an apparatus adapted to carry out the invention. In these drawings:

Figure 3 is a diagrammatic representation of the steps of the process.

Figure 1:
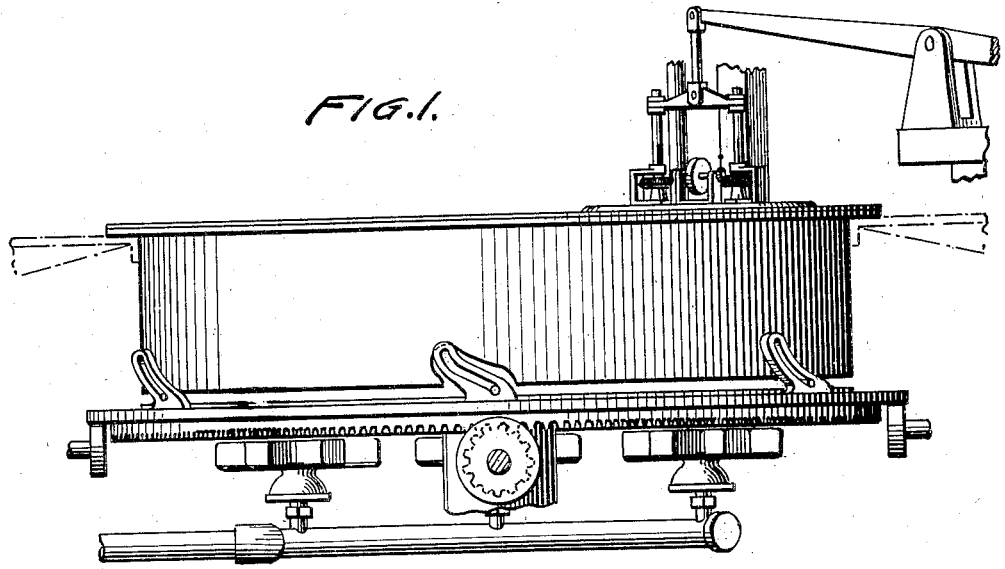
Figure 1 is an elevational view of a portion of the device.

As has been intimated, processes heretofore employed have required an excessive time for their proper completion. Large batches of ground phosphate rock and acid have been mixed together by an agitating mechanism and when the mass has assumed a spongy structure, the successive batches have been dumped one on the other in a large den. By building up large piles of the mass in this manner, the spongy structure is broken down and the reacting surface is greatly diminished. This necessarily requires an allowance of additional time to complete the reaction between the acid and phosphate.

We have found that the time required for a complete treatment may be greatly shortened by treating the phosphate rock, ground to a suitable degree of fineness, in small batches and heating the mixture. A measured quantity of phosphate rock may be admitted to the container and a quantity of sulphuric acid requisite to insure complete conversion of the insoluble phosphate run in. The mix may then be agitated by any suitable mechanism.

During this mixing process the acid reacts with the impurities of the rock with evolution of gaseous products of reaction, such as, hydrogen chloride, hydrogen fluoride and carbon dioxide. These gases in escaping from the mass open it up and leave behind a porous sponge-like residue. We propose to heat the mass at this stage. This application of heat besides accelerating the action between the acid and tri-calcium phosphate serves to quicken the evolution of the gases and expel them from the mass.

After this treatment the resulting product is highly porous and is in excellent physical condition for the subsequent steps of crystallization and drying. By reason of the interstitial structure of the product, a large area of reaction surface is presented which in addition to providing numerous points at which crystallization may initiate, serves also as an excellent radiating surface and hence facilitates dissipation of heat.

To carry out this process a mixing machine may be provided which may comprise a series of containers pivoted to a rotatable frame. The frame may be provided with a non-rotatable cover on which is mounted a stirring mechanism. In such an apparatus acid and rock may be admitted to a container and the stirring mechanism may be lowered therein and set in operation. After mixing the ingredients in this container for a sufficient time, the stirring mechanism may be raised and the frame rotated, thereby bringing another container under the stirring apparatus. In this way by repeating the operation, acid and rock may be admitted to successive containers and these ingredients stirred therein.

The bottom of the frame may be formed as a stationary closure upon which is mounted suitable heating apparatus, such as gas or oil burners. These may be positioned so as to heat the separate containers as they proceed in their circumferential movements. By a proper adjustment of the flame from the burners, the evolution of gases in the container may be accurately controlled. It will be understood that the cover of the frame which carries the stirring mechanism may be provided with a vent pipe for carrying off the evolved gases. It is to be understood that this heating apparatus is merely suggestive of a number that may be used. Any means which will supply heat to the mass whether operating within or without the container may be utilized.

After the mix has been heated and when the mass has acquired a firm texture, it may be removed from the container. This may be done by providing a tripping mechanism on the non-rotatable closure plate to engage each container successively. Inasmuch as the containers may be pivoted for movement in a vertical plane, the material may thus be automatically removed from them. It is advisable to provide the containers with tapering sides to facilitate the removal of the contents when they are tilted through the operation of the trip device.

There may be provided a belt by which to carry away the unit masses as they are removed from the containers. This may be an endless belt of conventional structure which is adapted to pass beneath the trip position of the containers. The porous moulds from the containers may thus be transported therefrom and deposited in a chamber where they are dried. During this transportation the moulds may be subjected to a current of air which will serve to quicken the drying step.

Before the moulds are completely dried and cooled, they may be dusted with raw phosphate dust to increase the available phosphate. This treatment may be done either before or after the drying step.

In the accompanying drawings a specific mechanical embodiment of the invention has been depicted. This comprises a circular frame member 1 mounted, for rotation, upon a simple support 2. The periphery of the support member 2 is flanged as at 2' and with the bottom of these flanges coact the supporting rollers 3. Adjacent the peripheral edge of the support there is formed a depending, grooved flange 4 which is adapted to serve as a circular rack. Meshing with this rack is a driving pinion 5 connected through the shaft 6 to any suitable source of power (not shown).

Mounted upon the supporting member or plate 1 is a circular, cylindrical container 7. This is provided with the non-rotatable top closure 8. The closure may be supported from any adjacent fixed structure by the support brackets 9 suitably positioned above the circumference of the closure. The closure is provided with a superimposed and smaller closure or cover 10. This member, as explained in the copending application, Serial No. 35,110, filed June 5, 1925, is adapted to support an agitating mechanism for the charge of rock dust and acid.

This agitating or mixing mechanism may comprise a plurality of shafts 11, connected by the cross tie 12 and link 13 to an elevating lever 14. This lever is suitably fulcrumed at any desired point upon the support 15. The shafts 11 are adapted to move longitudinally in the bracket supports 16 and may be journalled for rotative movement in the bushings or sleeves in the cross tie 12. Suitably keyed to a lower section of the shaft 11 are the driving pinions 17. These mesh with bevel pinions 18, fixedly secured to the two ends of the driving shaft 19. Intermediate its ends this driving shaft is provided with the driving pulley 20 which is rotated by the flexible chain or belt connection 21. The closure 10 is formed with the openings 22 and 23. As shown particularly in Fig. 2 the opening 22 is circular in form and is adapted to receive the pipe 24 through which acid may be admitted. The opening 24 is rectilinear in form and is adapted to receive a similarly formed chute or conduit 25, through which phosphate rock dust may be run.

As described hereinbefore the invention contemplates the treatment of phosphate rock dust with acid in small unit masses so as to obtain the manifold advantages set forth. To accomplish this a plurality of containers 26 are operatively associated with the rotatable container. In one preferred form the containers are provided with trunnions 27 which are received within curvilinear slots 28 of the supporting brackets 29. These slots are formed on the exterior of the supporting plate 1 and also on the aligned interior section. It will be seen from the description thus far that the plate 1 may be rotated through the geared driving connection and that such rotation will cause circumferential movement of the container 7 together with the enclosed mixing pans 26. There is also provided a trip mechanism 30 (Figure 3) which at a certain point in rotation is adapted to abut a container and cause it to tilt or oscillate about the axis 27 to eject the mold of phosphate.

Positioned below the plate 1 is a series of burners 31. These are shown as of the conventional gas burner type but it will be understood that any other comparable heating means may be employed. These burners are positioned circumferentially of the plate 1 in such a manner as to be subjacent to the several containers 26 in their intermittent positions of rest. The burners are supplied from a fuel line 32 connected to a source of supply (not shown).

Figure 2:
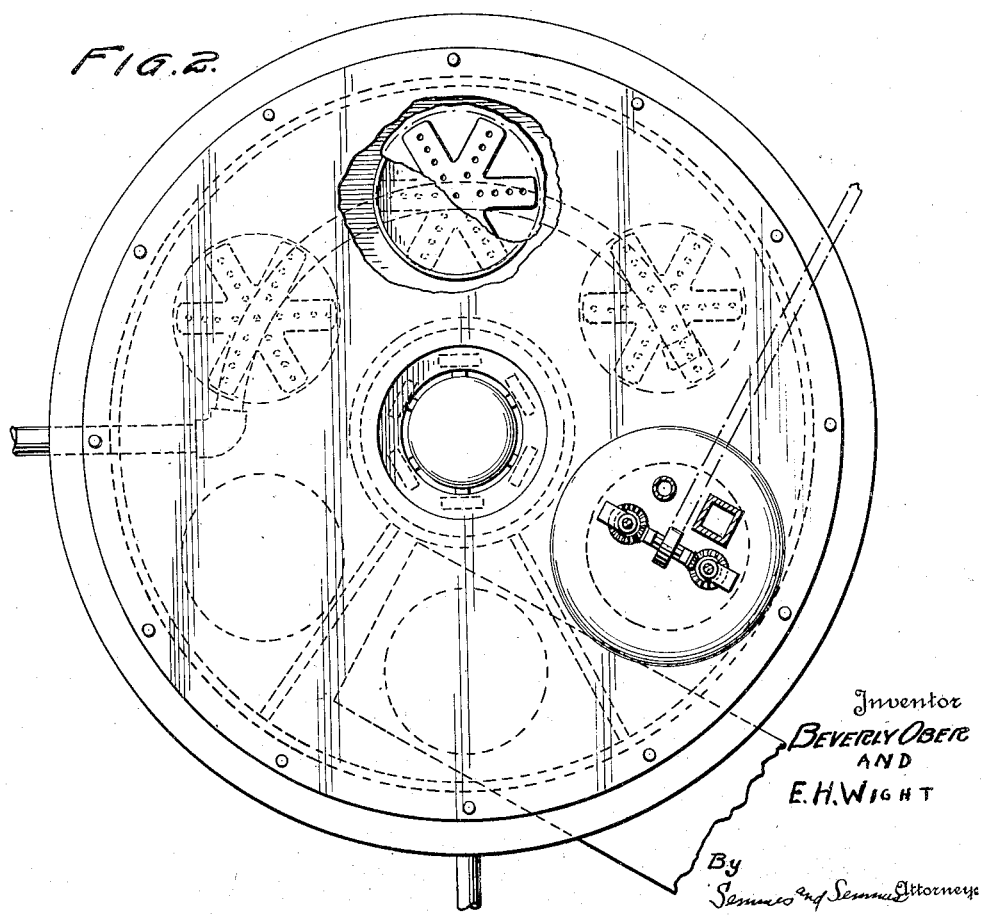
Figure 2 is a plan view of the apparatus shown in Figure 1.

As shown in Figure 2 there is provided a conveyor belt 33 which is adapted to carry the molds of phosphate from the mixing device to the subsequent stages of treatment.

When it is desired to operate the machine, predetermined quantities of acid and ground phosphate rock may be admitted to the mixing pan 26 through the lines 24 and 25 respectively. After such admission the mixing pan may be lowered by proper manipulation of the lever 14. Thereupon the mixing paddles 34 may be rotated by means of the transmission gearing 17, 18 and 20. This mixing is continued for a predetermined time which is calculated as sufficient to thoroughly incorporate the liquid acid with the rock. It will be understood that this mixing period is of short duration inasmuch as the reaction between phosphate rock and sulphuric acid is very rapid and is accompanied by a partial solidification of the reactive mass.

After the material in a container has been mixed the agitating mechanism is raised and the container rotated in the direction of the arrow $a$ (Figure 2) until the next succeeding mixing pan is stopped adjacent the mixing device. From an inspection of Fig. 2 it will be perceived that in such position that container 26 which has already received its charge of rock and acid will have moved into position above the first burner 31. The mixing operation, hereinbefore described, is repeated for the second container. During this time the reaction of the acid and rock in the first container will proceed quite rapidly due to the accelerating effect of heat applied to burner 31. This intermittent operation of the rotatable container is continued. As the several containers approach the end of their circumferential movement, designated by the position $b$ (Figure 2), they abut the trip device 30. This trip device is constructed with a cam surface and coacts with the container in such a manner as to cause it to move rearwardly and upwardly along the plane defined by the curvilinear slot 28. Concomitantly with this rearward movement the container oscillates about its trunnions and at a predetermined angular position the now solidified mold will drop by gravity on the conveyor belt 33. As intimated hereinbefore the containers are formed with tapered sides so as to facilitate this ejection.

It will be understood that during the mixing and reaction stages a considerable quantity of noxious gases are evolved. In the present device means are provided to retain these gases in a confined space and prevent their escape to the atmosphere. This may be achieved by providing a pair of pivoted door members 35. These members are pivoted at a point above the upper face of the several containers 26 and are adapted to be oscillated about this pivot when they are contacted by containers. The lower ends of these door members or closures may be weighted so as to permit their automatic return to closed position at the passage of each container. The upper closure plate 8 may be provided with any suitable gas vent (not shown). In this manner the evolved gases are retained in a substantially closed space and are drawn off as they are evolved.

After the mold of acid phosphate has been deposited on the continuous conveyor 33 it is carried to a container wherein it is further treated. As shown in Figure 3, the conveyor leads to a container 36 which is open to a source of acid absorbent which may consist of finely ground phosphate rock. As the mold enters the container it is dusted with phosphate rock, drawn as desired from the hopper 37. After this dusting operation the several molds are conveyed either by a belt conveyor or by gravity to suitable storage. In the apparatus shown in the drawings the dusted molds are passed through the chute 38 to a suitable storage receptacle.

As described hereinbefore during this whole travel over the belt 33, the unit masses may be subjected to the drying action of a current of hot air or other drying medium. Since the application of this step and a mechanism necessary for it is well understood to those skilled in the art, it has not been disclosed on the drawings.

It will now be seen that we have provided an apparatus which is well adapted to effectuate the principles of the invention. By means of this structure the phosphate rock and acid are treated in small unit masses and by the application of heat the essential reaction greatly accelerated. The applied heat not only accelerates the formation of acid phosphate but also increases the evolution of gas and thereby secures the optimum porosity of the molds. The apparatus is so manipulated and the treatment so adjusted that these molds are retained without disturbance of their porosity throughout their entire treatment.

It is to be understood that the apparatus here described exemplifies but one embodiment which may be utilized to carry out the underlying principles of this invention, the principal feature being the concept of heat treatment to increase porosity and the maintenance of a unit porous mass throughout the process. We therefore do not intend to be restricted to any particular apparatus to carry it out. Any mechanical device which will effectuate the principles of this invention, whatever be its operation, may be utilized.

We claim:

1. A process for manufacturing acid phosphate comprising mixing phosphate rock and mineral acid in relatively small individual batches, forming each batch into a moulded form and heating the batches without mechanical disintegration and drying and dusting the same before breaking the moulded form.

2. A process for manufacturing acid phosphate comprising mixing phosphate rock and mineral acid in relatively small individual batches, heating the batches, and dusting said batches without mechanical disintegration.

3. A process for manufacturing acid phosphate comprising mixing phosphate rock and mineral acid in relatively small individual batches, heating the batches, and dusting and aerating said batches without mechanical disintegration.

4. A process for manufacturing acid phosphate comprising mixing phosphate rock and mineral acid in relatively small individual batches, agitating said batches, heating the batches, dusting and aerating said batches without mechanical disintegration.

5. A process for manufacturing acid phosphate comprising the steps of mixing phosphate rock and an acid forming individual molds of the mixtures, heating the molded mixtures, allowing the molded mixtures to stand for a time sufficient to allow the molded mixture to assume a porous structure, aerating and drying the molded product before breaking the molds.

In testimony whereof we affix our signatures.

BEVERLY OBER.
EDWARD HYATT WIGHT.